United States Patent [19]
Moeller

[11] Patent Number: 6,143,050
[45] Date of Patent: Nov. 7, 2000

[54] MODIFYING SLAG FOR SMELTING STEEL IN ELECTRIC ARC FURNACES

[75] Inventor: Eric M. Moeller, Atlanta, Ga.

[73] Assignee: W. R. Grace & Co.- Conn., New York, N.Y.

[21] Appl. No.: 09/438,915

[22] Filed: Nov. 12, 1999

Related U.S. Application Data

[60] Provisional application No. 60/138,218, Jun. 9, 1999.

[51] Int. Cl.$^7$ .................................................. C21C 7/076
[52] U.S. Cl. ..................... 75/10.35; 75/10.5; 75/10.47; 75/10.48; 65/19
[58] Field of Search ............................... 75/10.47, 10.48, 75/10.5, 10.58, 10.53, 10.35, 326, 327; 65/19

[56] References Cited

U.S. PATENT DOCUMENTS

| | | | |
|---|---|---|---|
| 4,589,915 | 5/1986 | Gorgerino | 75/323 |
| 5,385,599 | 1/1995 | Freissmuth | 75/326 |
| 5,954,855 | 9/1999 | Gitman et al. | 75/10.42 |

FOREIGN PATENT DOCUMENTS

| | | |
|---|---|---|
| 2193539 | 1/1998 | Canada . |
| 10317048A | 12/1998 | Japan . |
| 2111179B | 5/1985 | United Kingdom . |

OTHER PUBLICATIONS

Hindman, James R. "Vermiculite as an Industrial Mineral" http://www.mcn.net/~verimculite/overview.html pp. 1–4. 1997.

The Schundler Company. "Vermiculite: Naturally Occuring, Safe, and Plentiful" wysiwyg:AnswerFrame.20//http:www.vermiculite.net/ pp. 1–4.

VCX™ *Vermiculite Ore Concentrate*, W.R. Grace & Co.–Conn., 1991.

*Primary Examiner*—Roy V. King
*Assistant Examiner*—Tima McGuthry Banks
*Attorney, Agent, or Firm*—Craig K. Leon; William L. Baker

[57] ABSTRACT

An improved method for modifying slag in an electric arc furnace comprising introducing into the slag, or on top of the slag, vermiculite platelets which have been refined into concentrated form whereby the flakes comprise at least 50%, and more preferably at least 80%, by dry weight hydrated magnesium aluminum (iron) silicate.

13 Claims, No Drawings

MODIFYING SLAG FOR SMELTING STEEL IN ELECTRIC ARC FURNACES

This nonprovisional application is based on provisional application Ser. No. 60/138,218 filed Jun. 9, 1999.

FIELD OF THE INVENTION

The present invention relates to a method for modifying slag in electric arc furnaces used in steel smelting operations, and more particularly to a novel method wherein a highly concentrated form of vermiculite flakes is used.

BACKGROUND OF THE INVENTION

Slag is the waste product which floats over molten steel within electric arc furnaces used in steel refining (e.g., smelting) operations. The main functions of the slag in the steel-making process include insulating the metallic bath (thereby helping to maintain the steel temperature), stabilizing the electric arc to protect the refractories from flare damage, improving the quality of the steel by absorbing sulfur and phosphorus, protecting the steel from oxidation, and other numerous benefits.

Conventional slag practice involved using high calcium lime, dolomitic lime, or a mixture of both to form the slag cover. However, due to the high temperatures generated by the electric arc within the furnace, there is a high loss of energy and notable chemical damage to the furnace refractory lining. To resolve this problem, the practice was to inject carbon over the bath to generate gases, such as carbon monoxide and carbon dioxide, that would be entrapped within the slag to form a foamy slag cover. This foamy slag cover improved heat transfer from the arc to the bath for faster temperature pickup of the metallic bath, resulting in improved heat transfer and reduction of the heat load on the furnace refractory walls and roof.

Canadian Patent Application No. 2,193,539 of Herrera-Gandara and Flores-Morales disclosed the use of a mixture of the mineral dolomite with mineral vermiculite, the latter of which is used for its ability to expand and foam the slag when exposed to the heat within the furnace. The dolomite and vermiculite crude ores are mined as raw minerals obtained by opencast working using explosives. The materials are then crushed using jaw crushers or roll crushers, and the crushed material is sized through a vibrating screen system to under ⅜ inches. The dolomite and vermiculite crude ores are mixed together in a 75:25 ratio and conveyed by hopper car to the electric arc furnace into which they are introduced. This mineral combination is said to improve physical and chemical properties as well as metallurgical functions of the slag by totally or partially replacing high calcium lime and/or dolomitic lime.

In contrast to the prior art processes, wherein crude (though size-screened) vermiculite particles are deployed in combination with other minerals, the present inventor believes that superior slag modification and steel refining performance can be achieved through the use of refined vermiculite flakes which can be used with other minerals but which are preferably deployed alone. A refined vermiculite product has been used for molten steel insulation (for example, it is commercially available under the MSI® brand name of W. R. Grace & Co.-Conn. through its Grace Construction Products unit), but this use of exfoliated vermiculite over molten steel is employed merely as thermal insulation in a downstream process and has not been used or suggested for use directly in the electric arc furnace smelting operation itself. The present inventor believes that the novel application of refined vermiculite, in the form of flakes, provides numerous advantages over the prior art.

SUMMARY OF THE INVENTION

In surmounting disadvantages of the prior art, the present invention provides a novel and improved method for modifying the slag in electric arc furnaces used for steel smelting. An exemplary method of the invention comprises introducing into an electric arc furnace containing slag a sufficient quantity of vermiculite flakes, the flakes containing at least 50%, and more preferably 80%, by dry weight hydrated magnesium aluminum (iron) silicate. (The use of the term "iron" in parenthesis is intended to indicate that the refined vermiculite may comprise iron or not; and, thus, the refined vermiculite flakes can be said to comprise at least 50% by dry weight hydrated magnesium aluminum iron silicate, hydrated magnesium aluminum silicate, or a mixture thereof). Preferably, the refined vermiculite flakes comprise gangue in an amount not exceeding 20%, and more preferably not exceeding 10%, based on total dry weight of the vermiculite flakes. One advantage or benefit of using refined vermiculite, in contrast to vermiculite crude ore which is in mined mineral form, is the removal of substantial amounts of clay materials and accessory minerals (which are sometimes referred to as "gangue") including quartz, pyroxene, sphene, and apatite, which may potentially be harmful to refractory wall linings. Preferably, there will be less than 20% by weight gangue in the refined or concentrated vermiculite, and most preferably less than 10% by weight. The resultant concentrated vermiculite should preferably be supplied in the form of "flakes," particles which having an aspect ratio (width to thickness) of about 10–60 and more preferably 20–40 and which are operative to exfoliate (e.g., expand) when heated (e.g., introduced directly into conventional electric arc furnaces used in steel smelting). One advantage of the invention, therefore, would be improved expansion properties, which would in turn enhance the insulative properties of the slag cover. The refined particles are rendered into a flake shape and would, because of the higher content of vermiculite platelets, provide a more consistent enhanced capability for incorporating air into the slag foam cover, whereby consistently excellent thermal insulative properties (for protecting refractory walls and roof) and consistently improved energy transfer (from the electric arc to the metallic bath) can be achieved. Another advantage of the invention is that the vermiculite concentrate has a higher concentration of MgO, therefore greatly improving the optimization of creating a foamy slag that is compatible with the refractory lining of the furnace. Further features and benefits of the invention may be further discussed in detail hereinafter.

DETAILED DESCRIPTION OF PREFERRED EMBODIMENTS

In contrast to prior art uses of vermiculite crude ore mineral particles for conditioning slag in electric arc furnaces, the present invention employs a highly refined or concentrate vermiculite ore that is believed to provide consistently improved thermal insulation when employed in slag cover and consistently improved protection for refractory furnace walls. By decreasing the amount of gangue in the particles, better quality control over and reproduceability of good slag cover can be obtained in the refractory furnace environment using the refined vermiculite of the invention.

An exemplary vermiculite ore concentrate (refined), as characterized above, suitable for use in the invention, can be obtained by milling the mined vermiculite to separate clays and rocks from the vermiculite ore. The mill process involves propelling the mined ore particles with water and/or air through variously sized screens (and optionally hydrocyclones) as is known in the vermiculite processing art. Then, quartz, sand, and other non-vermiculite matters can be removed by flotation and/or mechanical action, e.g., shaking tables to separate round particles from flat particles), also as generally known in the vermiculite processing art. The resultant concentrated or refined vermiculite concentrate is preferably in the form of flakes which generally are flatter in shape than the round, nonuniform clumps of vermiculite crude ore (just mined). This process of obtaining a refined (or concentrate) vermiculite ore is believed to reduce substantially the content of "gangue," which comprises clay materials and accessory minerals such as sand, quartz, pyroxene, sphene, and apatite, such that the amount of these accessory minerals is less than 50%, more preferably less than 20%, and most preferably less than 10%, total dry weight of the ore. The result is that the vermiculite is transformed from a lumpy or agglomerated particulate to a generally "flake" shape which can be more accurately sized so as to have a more uniform size distribution if and when desired. Preferably, the vermiculite concentrate comprises at least 50% vermiculite (platelets), more preferably 70%, and most preferably at least 80% by weight. The "flakes" have a large aspect ratio (width to thickness) of about 10–60, and more preferably about 20–40, and generally are comprised of "books" or small stacks of nonexfoliated platelets. The bulk density of the refined vermiculite flakes can be 10–80 pounds per cubic foot, and more preferably 50–70 pounds per cubic foot. The refined vermiculite plates have the basic chemical formula $(Mg, Ca, K, FeII)_3 (Si, Al, FeIII)_4O_{10}(OH)_2.4H_2O$. Preferred refined or concentrated vermiculite suitable for use in the invention further has a maximum silica content of 0–50%. A refined or concentrated vermiculite ore in flake form is commercially available from W. R. Grace & Co.-Conn., Grace Construction Products, under the tradename VCX™.

The refined vermiculite ore flakes useful in the present invention can be added before or during the slag formation process in an electric arc furnace. The exemplary ore flakes described above will noticeably expand to have a lighter bulk density which, it is believed, will further improve thermal insulative processes while facilitating energy transfer from the electric arc into the metallic bath, through enhanced air entrainment in the slag foam generated in the steel smelting process. The resultant lighter bulk density after expansion is due in large part to the decrease in gangue materials which do not by nature expand when exposed to heat.

The foregoing details are provided for illustrative purposes only and are not intended to limit the scope of the invention as described by the appended claims.

I claim:

1. Method for modifying slag in an electric arc furnace for smelting steel, comprising: introducing into a slag formed over a molten steel bath during a smelting operation in an electric arc furnace vermiculite in the form of books of substantially nonexfoliated platelets containing at least 50% by dry weight hydrated magnesium aluminum silicate, said vermiculite flakes comprising gangue in an amount not exceeding 20% total dry weight, wherein said gangue comprises quartz, pyroxene, sphene, apatite, or a mixture thereof.

2. The method of claim 1 wherein said flakes contain at least 80% by dry weight hydrated magnesium aluminum silicate.

3. The method of claim 1 wherein said vermiculite flakes further comprise iron.

4. The method of claim 3 wherein said books of vermiculite flakes comprise gangue in an amount not exceeding 10% total dry weight.

5. The method of claim 4 wherein said gangue comprises quartz.

6. The method of claim 1 wherein said books of vermiculite flakes have an average bulk density of 10–80 pounds per cubic foot.

7. The method of claim 1 wherein said books of vermiculite flakes have an average bulk density of 50–70 pounds per cubic foot.

8. The method of claim 1 wherein said vermiculite flakes have the following chemical formula $$(Mg, Ca, K, FeII)_3(Si, Al, FeIII)_4O_{10}(OH)_2.4H_2O.$$

9. The method of claim 1 wherein said vermiculite flakes comprise the following components in the following percentage range by weight: $SiO_2$ (36–46%); MgO (16–24%); $Al_2O_3$ (11–16%), $Fe_2O_3$ (8–13%); $K_2O$ (4–6%); CaO (1–3%); $TiO_2$ (1–3%); MnO (0.1–0.2%); $Cr_2O_3$ (0.05–0.2%); and $Na_2O$ (0.1–0.3%).

10. The method of claim 1 wherein said vermiculite flakes have a cation exchange capacity of between 50–250.

11. The method of claim 1 wherein a further mineral is introduced into or onto the slag contained in said electric arc furnace, said further mineral selected from the group comprising dolomite, limestone, perlite, or mixture thereof.

12. The method of claim 1 wherein said vermiculite flakes comprise MgO in the range of 16–24% by weight.

13. The method of claim 1 wherein said vermiculite flakes comprise at least 80% by dry weight hydrated magnesium aluminum silicate and have an aspect ratio in terms of width-to-thickness ratio of at least twenty.

* * * * *